US012583610B2

(12) United States Patent
Parmentier et al.

(10) Patent No.: US 12,583,610 B2
(45) Date of Patent: Mar. 24, 2026

(54) AIRCRAFT PROPULSION SYSTEM AND METHOD FOR OPERATING SUCH A SYSTEM

(71) Applicant: SAFRAN AIRCRAFT ENGINES, Paris (FR)

(72) Inventors: Nicolas Claude Parmentier, Moissy-Cramayel (FR); Marc Missout, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 361 days.

(21) Appl. No.: 17/292,658

(22) PCT Filed: Nov. 19, 2019

(86) PCT No.: PCT/EP2019/081809
§ 371 (c)(1),
(2) Date: May 10, 2021

(87) PCT Pub. No.: WO2020/104460
PCT Pub. Date: May 28, 2020

(65) Prior Publication Data
US 2022/0001998 A1 Jan. 6, 2022

(30) Foreign Application Priority Data
Nov. 22, 2018 (FR) ...................................... 1871723

(51) Int. Cl.
*B64D 35/04* (2006.01)
*B64D 27/02* (2006.01)
(Continued)

(52) U.S. Cl.
CPC ............. *B64D 35/04* (2013.01); *B64D 27/14* (2013.01); *B64D 27/33* (2024.01); *B64D 27/357* (2024.01); *B64D 35/023* (2024.01); *B64D 27/026* (2024.01)

(58) Field of Classification Search
CPC .......................... B64D 35/04; B64D 2027/026
See application file for complete search history.

(56) References Cited

U.S. PATENT DOCUMENTS 2,860,447 A * 11/1958 Muller ................... A63H 30/00
74/342
5,480,107 A * 1/1996 Bacon .................. B64D 27/023
244/58

(Continued)

OTHER PUBLICATIONS

Search Report from the French Intellectual Property Office on corresponding FR application (FR1871723) dated Jul. 11, 2019.
(Continued)

*Primary Examiner* — Ashesh Dangol
(74) *Attorney, Agent, or Firm* — Alumen IP Law PC

(57) ABSTRACT
The invention relates to a propulsion system intended to be mounted on an aircraft comprising a main body, said propulsion system comprising: —a first rotating propulsive member and a second rotating propulsive member that are intended to be mounted on either side of said main body, —a transmission housing connected to the first rotating propulsive member via a first mechanical shaft and to the second rotating propulsive member via a second mechanical shaft, —a single gas generator connected to said transmission housing and configured to rotate the first rotating propulsive member and the second rotating propulsive member, and—a single auxiliary turbomachine configured to rotate the first rotating propulsive member and the second rotating propulsive member independently of the gas generator.

6 Claims, 4 Drawing Sheets

(51) Int. Cl.

| | |
|---|---|
| *B64D 27/14* | (2006.01) |
| *B64D 27/33* | (2024.01) |
| *B64D 27/357* | (2024.01) |
| *B64D 35/023* | (2025.01) |

(56) References Cited

U.S. PATENT DOCUMENTS

| | | | | |
|---|---|---|---|---|
| 9,937,803 B2* | 4/2018 | Siegel | .................... | B64D 27/24 |
| 2006/0011780 A1 | 1/2006 | Brand et al. | | |
| 2008/0238191 A1* | 10/2008 | Cottingham | .............. | H02J 9/06 |
| | | | | 361/88 |
| 2015/0191250 A1* | 7/2015 | DeVita | .................... | B64C 27/12 |
| | | | | 701/3 |
| 2015/0284071 A1* | 10/2015 | Veilleux, Jr. | ............ | B64C 11/48 |
| | | | | 244/62 |
| 2016/0176534 A1 | 6/2016 | Himmelmann et al. | | |
| 2016/0355272 A1 | 12/2016 | Moxon | | |
| 2017/0081034 A1* | 3/2017 | Marrinan | ............... | B64D 29/04 |
| 2017/0225573 A1* | 8/2017 | Waltner | ................. | B60L 50/50 |
| 2018/0057149 A1* | 3/2018 | Heiberg | .................. | B64C 13/34 |
| 2019/0283858 A1* | 9/2019 | Mueller | ................. | F16D 13/40 |
| 2020/0052556 A1* | 2/2020 | Luo | .......................... | H02K 7/14 |

OTHER PUBLICATIONS

International Search Report and Written Opinion on corresponding PCT application (PCT/EP2019/081809) from International Searching Authority (EPO) dated Jan. 21, 2020.

\* cited by examiner

[Fig. 1]
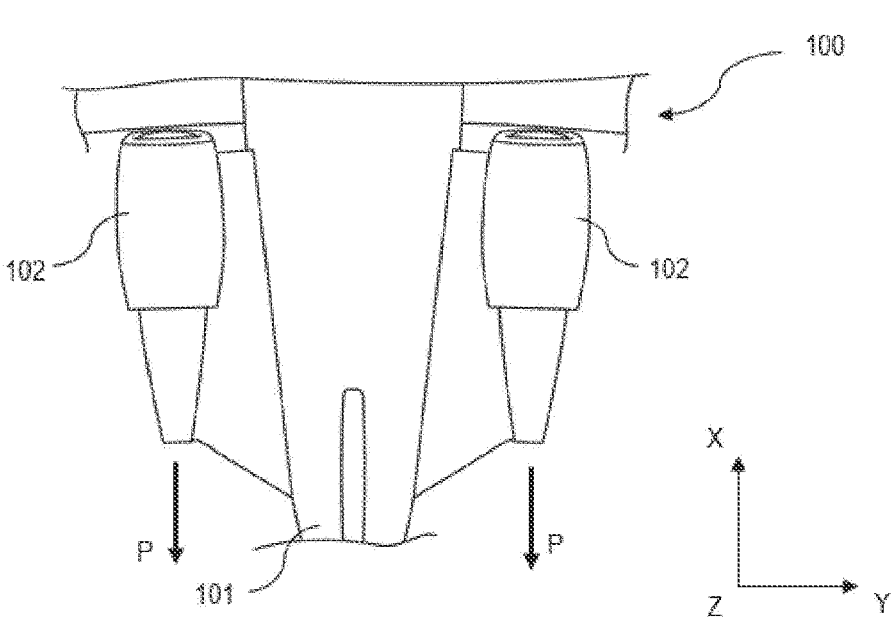
[Fig. 2]
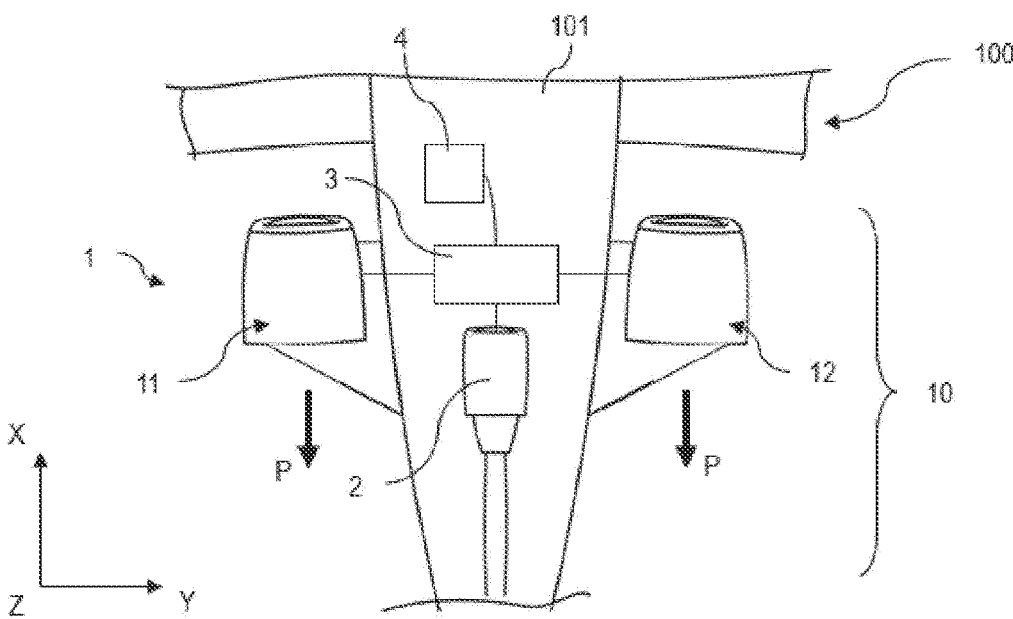

[Fig. 3]
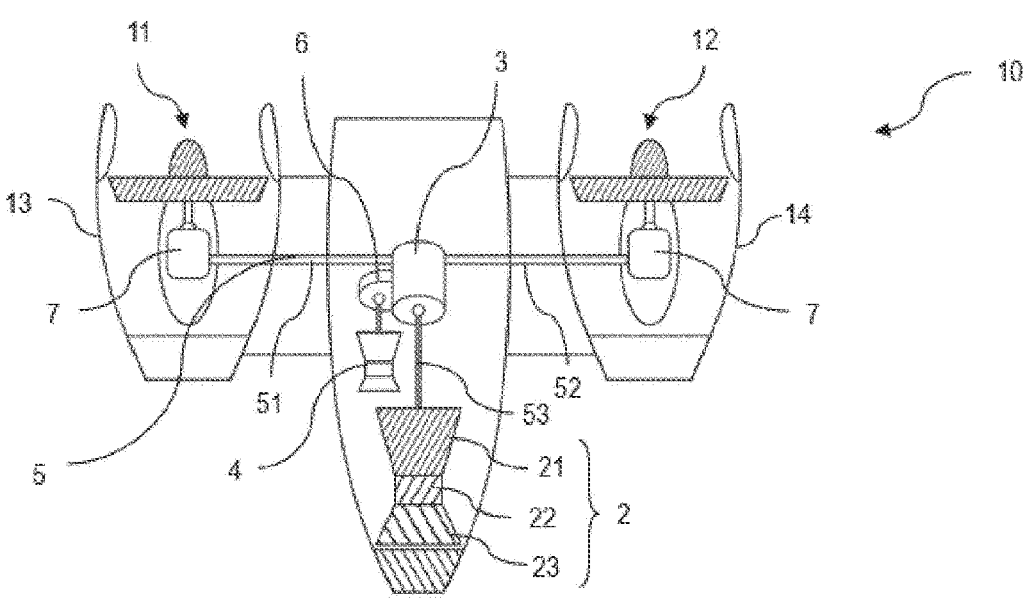
[Fig. 4]
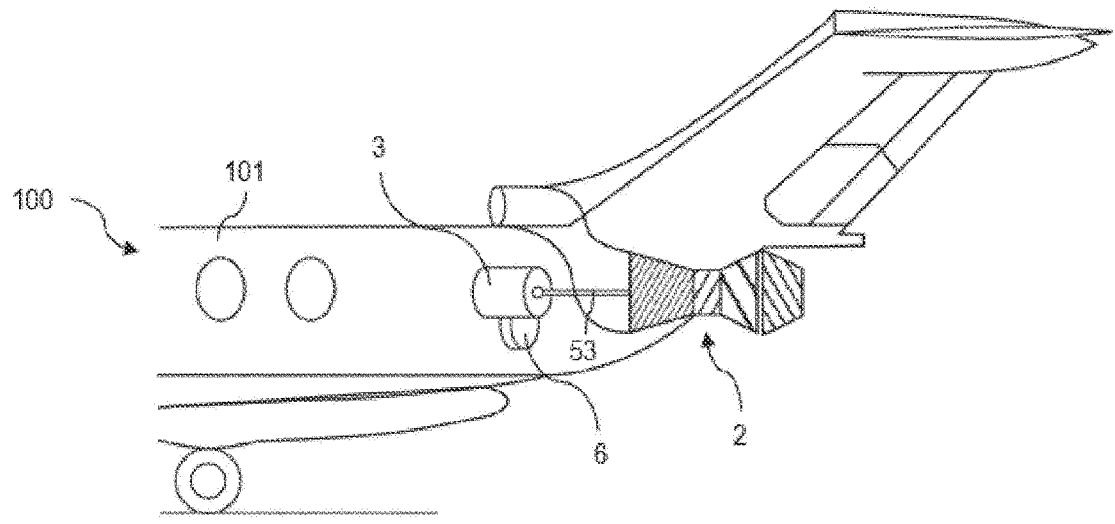

[Fig. 5]
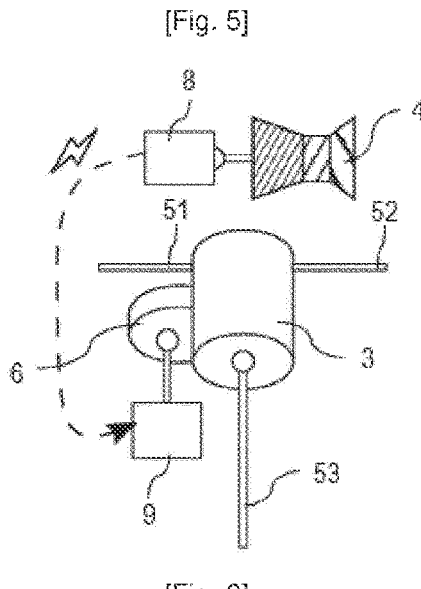
[Fig. 6]
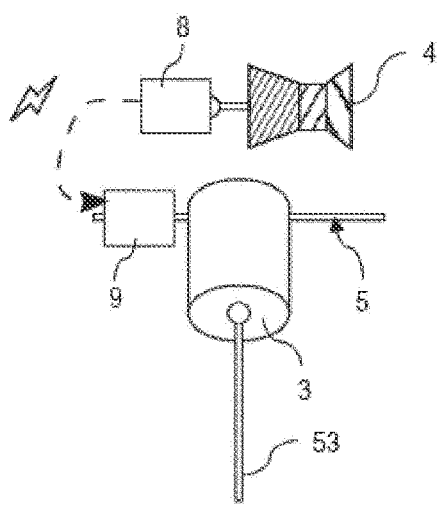
[Fig. 7]
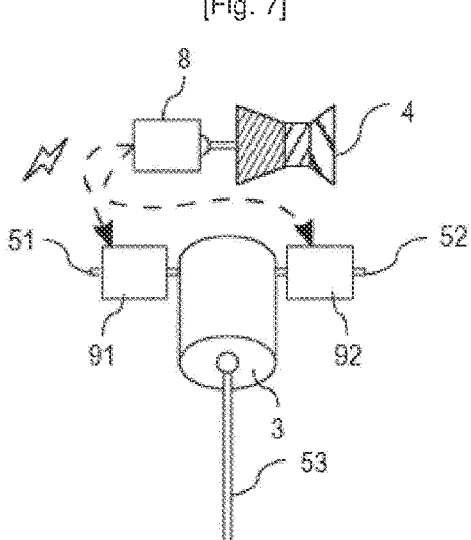

[Fig. 8]
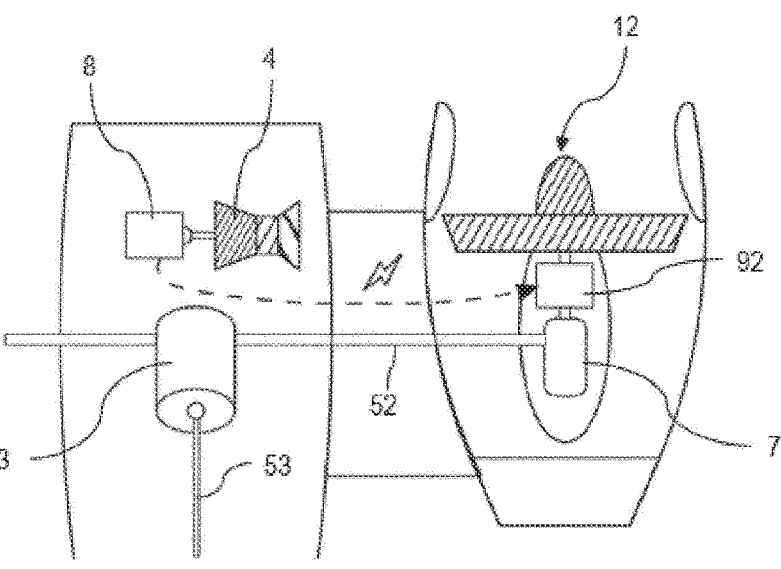
[Fig. 9]
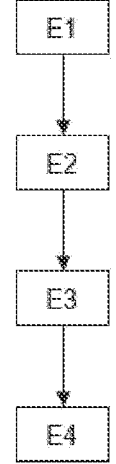

AIRCRAFT PROPULSION SYSTEM AND METHOD FOR OPERATING SUCH A SYSTEM

TECHNICAL FIELD

The present invention relates to the field of aircrafts and, in particular, to a propulsion system for an airplane.

BACKGROUND

In this document, with reference to FIG. 1, an airplane 100 extends longitudinally along an X axis, laterally along a Y axis and vertically along a Z axis so as to form an orthogonal reference frame (X, Y, Z). Moreover, in such a reference frame, the front and rear are defined along X axis with reference to the displacement of the airplane 100 in flight. In other words, the front and rear of the airplane 100 are defined along X axis in FIG. 1 which is oriented from the rear to the front. In a known manner, the airplane 100 comprises a main body 101, known as the "fuselage", extending along the axis of the airplane 100 and two side wings (not represented).

In a known manner, in order to enable the displacement of the airplane 100, this comprises a propulsion system configured to generate a thrust P in the direction opposite to the displacement of the airplane 100, so as to propel the latter forwardly. As illustrated in FIG. 1, such a propulsion system comprises, in a known manner, two turbine engines 102, generally positioned on either side of the main body 101 of the airplane 100. As is known, a turbine engine is a combustion engine configured to rotatably drive a rotating propulsive member by means of an air flow ingested by the engine. Among the turbine engines, it is known that there are turbojet engines, which are equipped with an air guide casing, and turboprop engines, which are devoid of it. In the case of a turbojet engine, the rotating propulsive member is referred to as the fan, whereas in the case of a turboprop engine, the rotating propulsive member is referred to as the propeller.

Also, in order to provide thrust to the airplane, a turbojet engine is configured to produce an acceleration of the air between inlet and outlet of the turbojet engine. For this, in a known manner, the turbojet engine, which will be referred more generally hereinafter to as an "engine," comprises a guide casing in which a fan, and a gas generator to drive the fan, are mounted.

The gas generator comprises at least one compressor, configured to compress an incoming air stream so as to output air having high speed, pressure and temperature. The gas generator further comprises a combustion chamber for combustion of a compressed air stream with fuel to generate a significant amount of energy. Finally, the gas generator comprises at least one turbine configured to recover energy from the combustion chamber in order to drive the compressor and fan. The air stream generated by the fan generates thrust to propel the airplane forwardly.

In a known way, the gas generator is housed in the air guide casing, which has dimensions adapted to the weight of the aircraft, so as not to be detrimental to the performance of the aircraft when in flight.

In the case of a small airplane, due to its low weight, the engine has reduced dimensions, which has the drawback of requiring the integration of a small compressor, whose compression ratio and temperature of the gases leaving the compressor are limited. Such limitations do not always allow for optimal engine efficiency.

In order to eliminate these drawbacks, small airplanes comprising a single engine directly fastened to the fuselage, generally on top of the airplane are known. Such a configuration, referred to as single engine architecture, allows the placement of a proportionally larger compressor in relation to the fuselage dimensions. However, such an architecture is only contemplatable on some types of airplanes, since it requires the placement of an engine with dimensions offering good aerodynamic conditions.

The purpose of the invention is therefore to overcome these drawbacks at least in part by providing a simple and efficient propulsion system that can be integrated into small airplanes, while ensuring optimal thrust.

Incidentally, a propulsion system described in document US20160355272A1 is known, comprising two propulsive assemblies, positioned on either side of the airplane fuselage. Each propulsion assembly comprises a gas generator configured to drive a plurality of fans and to store electric energy. The propulsion system further comprises a switch for transferring stored electric power between the two propulsive assemblies. Due to its overall size, such propulsive assemblies can only be mounted on large airplanes.

Further incidentally, a propulsion system described in EP3190052A1 is also known, comprising a gas generator and a fan so as to ensure propulsion of the aircraft in flight. The system further comprises an electrical device, connected to the fan, comprising a storage module configured to store energy when the gas generator is in operation. The electrical device is then configured to supply energy to the fan during taxiing operations, so as to limit the use of the gas generator. However, the propulsion system described in EP3190052A1 does not solve the problem related to engines mounted on small airplanes.

Incidentally, from patent application US2006/011780A1, a rear-tip propulsion system with a mechanical propulsion architecture that does not comprise any propulsive redundancy is known. In another field, from patent application US2016/176534A1, an electric propulsion architecture, that is, to provide electric and not mechanical power via shafts, having electrical redundancy is also known.

SUMMARY

To this end, the invention relates to a propulsion system for being mounted on an aircraft comprising a main body, said propulsion system comprising:

a first rotating propulsive member and a second rotating propulsive member, for being mounted on either side of said main body, a transmission box, connected to the first rotating propulsive member via a first mechanical shaft and to the second rotating propulsive member via a second mechanical shaft a single gas generator comprising a compressor, a combustion chamber and a turbine, the gas generator being connected to said transmission box in order to rotatably drive the first rotating propulsive member and the second rotating propulsive member, and a single auxiliary turbomachine, configured to rotatably drive the first rotating propulsive member and the second rotating propulsive member independently of the gas generator.

Such a propulsion system advantageously allows the dissociation of the rotating propulsive members and the gas generator, allowing the placement of a single gas generator which can thus be placed in a position different from the rotating propulsive members on the fuselage of the airplane, which reduces its aerodynamic impact. Moreover, the gas generator has advantageously larger dimensions and thus a greater efficiency, since it is independent of the rotating propulsive members. By the term "rotating propulsive member", it is meant a propeller or a fan not comprising a gas generator directly associated with the rotating propulsive member. According to the invention, such a gas generator is offset from the rotating propulsive members. By dissociating the gas generator from the rotating propulsive member, constraints related to the compression ratio of the gas generator are dispensed with, since the rotating propulsive member alone in a casing makes it possible to displace a larger volume of air, allowing a greater thrust.

The propulsion system according to the invention also has the advantage of being able to be placed on small airplanes. The placement of a gas generator of larger dimensions makes it possible to obtain a higher compression ratio as well as a higher inlet temperature of the combustion chamber, allowing for greater efficiency.

Furthermore, such a propulsion system advantageously allows the use of rotating propulsive members having reduced dimensions, making it possible to limit aerodynamic disadvantages in flight, due to large overall size equipment, especially to the placement of overly bulky casings.

According to one embodiment of the invention, the first rotating propulsive member being characterized by a first direction of rotation and the second rotating propulsive member being characterized by a second direction of rotation, the first rotating propulsive member and the second rotating propulsive member are configured to rotate in identical directions of rotation.

Such a configuration advantageously allows the use of two rotating propulsive members of the same type that can be manufactured in a similar manner and do not need to be positioned in a particular casing on the aircraft, saving time when mounting the propulsion system on the aircraft.

Alternatively, the first rotating propulsive member being characterized by a first direction of rotation and the second rotating propulsive member being characterized by a second direction of rotation, the first rotating propulsive member and the second rotating propulsive member are configured to rotate in opposite directions of rotation.

Such an alternative configuration advantageously makes it possible to limit the aerodynamic disadvantage due to an external air stream applied to the aircraft in flight by optimizing the symmetry in the flow of such external air stream over the main body of the aircraft. The direction of rotation of each rotating propulsive member is configured to be advantageously selected to limit distortion of the air stream entering the casing or perceived noise from within the aircraft.

Preferably, each rotating propulsive member is configured to provide a thrust between 1000 Ibf (4448N) and 8000 Ibf (35584N), preferably between 1000 Ibf (4448N) and 7000 Ibf (31136N) . . . Such a thrust is adapted for an airplane of small dimensions. In the case of a propeller, the mechanical power is between 2*400 kW (2*536 shp) and 2*2500 kW (2*3621 shp).

Preferably, the transmission box is connected to the first rotating propulsive member by the first mechanical shaft and to the second rotating propulsive member by the second mechanical shaft, advantageously allowing the two rotating propulsive members to be connected to a single gas generator, which has the advantage of allowing both rotating propulsive members to be driven simultaneously at the same speed of rotation.

According to another aspect of the invention, the first mechanical shaft and the second mechanical shaft form a single mechanical shaft configured to connect the first rotating propulsive member, the second rotating propulsive member, and the transmission box.

According to one embodiment of the invention, the propulsion system comprises a clutch module configured to mechanically connect the auxiliary turbomachine to the transmission box. Such a clutch module advantageously allows the auxiliary turbomachine to be connected to or disconnected from the transmission box, allowing switching between the auxiliary turbomachine and the gas generator, so as to cause the rotating propulsive members to be rotated by one or the other of the energy sources.

Alternatively, the propulsion system comprises at least one electric generator, connected to the auxiliary turbomachine, and at least one electric motor, fed by the electric generator and configured to rotatably drive the first rotating propulsive member and the second rotating propulsive member. Such a configuration advantageously makes it possible to limit energy dissipation in the different mechanical modules. Furthermore, it makes it possible to facilitate positioning of the auxiliary turbomachine and the electric generator, the latter being conveniently connected to the electric motor by an electric cable.

Preferably, the propulsion system comprises an electrical storage battery configured to be powered by the electrical generator to allow power to be supplied to the electric motor without the auxiliary turbomachinery or gas generator being in operation, for example during taxiing operations.

In a first configuration, the electric motor is connected directly to the transmission box to drive it directly. Such a configuration advantageously makes it possible to replace, for example, the auxiliary turbomachine if the latter should have reduced capacities or even in the event of the need to supplement the energy delivered by the auxiliary turbomachine or by the gas generator.

In an alternative configuration, the first mechanical shaft and the second mechanical shaft form a single mechanical shaft, said electric motor is directly connected to said single mechanical shaft to drive it directly. Such a configuration advantageously makes it possible to limit energy losses in the transmission box, while allowing drive of the two rotating propulsive members by a single electric motor in the event of mounting a single mechanical shaft.

In another alternative configuration, the first mechanical shaft and the second mechanical shaft being independent, the propulsion system comprises a first electric motor, mounted on the first mechanical shaft to drive it directly, and a second electric motor, mounted on the second mechanical shaft to drive it directly. Advantageously, two electric motors allow power losses via the transmission box to be limited when the propulsion system comprises two separate mechanical shafts.

According to an alternative embodiment of the invention, the propulsion system comprises a first electric motor mounted directly on the first rotating propulsive member to drive it directly and a second electric motor mounted directly on the second rotating propulsive member to drive it directly. Such an embodiment advantageously allows for further reduction of transmission energy losses by mounting a motor directly on a rotating propulsive member. The placement of electric motors directly on the rotating propulsive members also allows for a more robust assembly that is less susceptible to mechanical failure of each mechanical shaft.

Another object of the invention is an aircraft comprising a main body and a propulsion system as set forth above, the first rotating propulsive member and the second rotating propulsive member being mounted on either side of said main body. Preferably, the aircraft comprises a single propulsion system.

Furthermore, the invention relates to a method for operating a propulsion system as described above, said method comprising:

a step of activating the single gas generator, a step of rotatably driving, via the transmission box, the first mechanical shaft and the second mechanical shaft, and a step of rotatably driving the first rotating propulsive member via the first mechanical shaft and the second rotating propulsive member via the second mechanical shaft.

Such a method advantageously allows the operation of the rotating propulsive members in the event of a decrease in the power of the gas generator, making it possible, for example, to ensure the flight of the airplane to the nearest airport in the event of a malfunction. Indeed, the activation of the auxiliary turbomachine ensures the operation of the rotating propulsive members in flight. The propulsion system is thus reliable.

BRIEF DESCRIPTION OF THE DRAWINGS

The invention will be better understood upon reading the following description, given solely by way of example, and referring to the appended drawings in which:

FIG. 1 is a schematic representation of a propulsion system according to prior art;

FIG. 2 is a schematic representation of a propulsion system according to one exemplary embodiment of the invention;

FIG. 3 represents schematically a first embodiment of a propulsion system of FIG. 2;

FIG. 4 schematically represents an example of positioning an auxiliary turbomachine of the propulsion system of FIG. 2;

FIG. 5, FIG. 6 and FIG. 7 represent several alternatives of a second embodiment of the propulsion system according to the invention comprising an electric generator for powering one or more electric motors, each of the figures being a schematic representation of a positioning of the electric motor(s);

FIG. 8 represents a third embodiment of a propulsion system according to the invention; and FIG. 9 represents a method for operating a propulsion system according to one exemplary implementation of the invention.

It should be noted that the figures set out the invention in detail to implement the invention, said figures of course being able to be used to better define the invention if necessary.

DETAILED DESCRIPTION

As previously described, an airplane 100 comprises a main body 101, known as the "fuselage" delimiting the passenger compartment of the airplane 100, and an airfoil, comprising two wings (not represented), extending on either side of the main body 101 of the airplane 100, and allowing to ensure its lift in flight.

With reference to FIG. 2, the airplane 100 extends longitudinally along an X axis, laterally along a Y axis and vertically along a Z axis so as to form an orthogonal reference frame (X, Y, Z). In such a reference frame, the front and rear are defined along X axis with reference to the displacement of the airplane 100 in flight. In other words, the front and rear of the airplane 100 are defined along X axis in FIG. 2 which is oriented from the rear to the front. Further, in such a reference frame, the term "transverse" refers to an object extending along lateral Y axis.

In order to enable the displacement of the airplane 100, this comprises a propulsion system 10 configured to generate thrust P in the direction opposite to the displacement of the airplane 100, so as to propel the latter forwardly. In this example, the airplane 100 comprises a single propulsion system 10. According to the invention, the propulsion system 10 comprises two rotating propulsive members 1, a single gas generator 2, a transmission box 3 and a single auxiliary turbomachine 4.

Each rotating propulsive member 1 is configured to provide a thrust between 1000 lbf (4448N) and 7000 lbf (31136N) which is adapted for a small airplane.

The propulsion system 10 comprises a first rotating propulsive member 11 and a second rotating propulsive member 12. By the term "rotating propulsive member", it is meant a propeller or fan that does not comprise a gas generator directly associated with the rotating propulsive member 1, since it is offset from the rotating propulsive members 1, as will be described in more detail later in this document. A rotating propulsive member 1 may also be referred to as a "propulsive effector", since it provides the propulsion function for the airplane 100.

Each rotating propulsive member 1 may be free/unducted or ducted, that is, the latter may or may not be mounted in a guide casing with an annular cross-section and allowing for better aerodynamic stream. In other words, the propulsion system 10 according to the invention is configured to be adaptable to both a turbojet engine and a turboprop engine, according to the terms defined above. The rotating propulsive member 1 may or may not be associated with a straightener, may or may not be associated with a contra-rotating propeller, and may be adapted to pull as a puller or push as a pusher.

According to one preferred embodiment, with reference to FIG. 3, the first rotating propulsive member 11 and the second rotating propulsive member 12 are respectively configured to be mounted in a first casing 13 and in a second casing 14, advantageously allowing the air stream generated by the rotating propulsive member 1 to be oriented and disturbances in the air stream generated upon rotating each rotating propulsive member 1 to be limited.

The first rotating propulsive member 11 and the second rotating propulsive member 12 are positioned on opposite sides of the main body 101 of the airplane 100. Even more preferably, the rotating propulsive members 1 are positioned at the rear of the airplane 100, equidistant from the main body 101, so as to provide a balanced thrust P on either side of the airplane 100.

Each rotating propulsive member 1 is characterized by a direction of rotation allowing the generation of the air stream in the first casing 13 and in the second casing 14. According to two alternative embodiments of the invention, the first rotating propulsive member 11 and the second rotating propulsive member 12 may rotate respectively in a first direction of rotation and a second direction of rotation that are identical or opposite.

Indeed, in a first embodiment, the rotating propulsive members 1 are configured to rotate in identical directions of rotation, which has the advantage of allowing the placement of two similar rotating propulsive members 1 on the airplane 100, advantageously allowing the manufacture of fans or propellers having identical characteristics.

In a second embodiment, the rotating propulsive members 1 are configured to rotate in opposite directions of rotation, which has the advantage of minimizing the aerodynamic impact on the airplane 100 by allowing a symmetrical flow of an external air stream over the main body 101 of the airplane 100. In such a configuration, the first direction of rotation and the second direction of rotation are configured to be chosen, for example, to minimize distortion at the inlet of the first casing 13 and the second casing 14 or to reduce the noise perceived, for example by passengers, from within the airplane 100.

Both rotating propulsive members 1 are configured to ingest an air flow at the front of the airplane 100 and to reject it to the rear of the airplane 100, so as to generate thrust P. Advantageously, in the absence of a gas generator in the guide casing, each rotating propulsive member 1 allows for a larger volume of air to be moved and for a greater thrust P to be provided.

As represented in FIG. 3, the propulsion system 10 comprises a gas generator 2 that is offset from the rotating propulsive members 1. In a known manner, the gas generator 2 comprises a compressor 21, a combustion chamber 22 and a turbine 23, configured to generate significant energy for rotating the rotating propulsive members 1 remotely. Advantageously, due to its offset, the gas generator 2 has small dimensions and allows the generation of a large drive torque.

The compressor 21 is configured to compress an incoming air stream from outside the gas generator 2. Preferably, the compressor 21 has a compression ratio between 10 and 45. The combustion chamber 22 is configured to mix the compressed air stream with fuel to release a significant amount of energy at the outlet of the combustion chamber 22, enabling the turbine 23 to be driven. The latter recovers the energy from the combustion chamber 22 in order to drive the compressor 21 as well as the first rotating propulsive member 11 and the second rotating propulsive member 12 via the transmission box 3, as will be described in greater detail later in this document. The compressor 21 as well as the turbine 23 may comprise one or more bodies.

The gas generator 2 is configured to be mounted, in a preferred manner, at the rear of the main body 101 of the airplane 100, allowing it to be centered along the width of the airplane 100. Such a positioning makes it possible, by means of a single gas generator 2, to remotely drive, via mechanical connections, the simultaneous rotation of the two rotating propulsive members 1 located on either side of the main body 101. Further preferably, as represented in FIG. 4, the gas generator 2 is integrated at the rear end of the airplane 100, in this example under the vertical stabilizer of the airplane 100, that is under the aileron extending vertically at the tail of the airplane 100 and ensuring its stability. The gas generator 2 thus advantageously causes no aerodynamic loss in flight.

The integration of a single gas generator 2 positioned at the rear of the main body 101 of the airplane 100 advantageously allows the placement of a gas generator 2 having larger dimensions since it is not in direct engagement with a rotating propulsive member 1. The gas generator 2 is thus configured to produce a larger amount of energy for an overall size similar to prior art.

In order to provide thrust to the airplane 100, with reference to FIG. 3, the gas generator 2 is mechanically connected to each of the two rotating propulsive members 1 via mechanical shafts 51, 52, 53 and the transmission box 3.

The transmission box 3 is connected to the first rotating propulsive member 11 via a first mechanical shaft 51, to the second rotating propulsive member 12 via a second mechanical shaft 52 and to the gas generator 2 via a third mechanical shaft 53.

Such a transmission box 3 is configured to transmit a drive torque received from the gas generator 2, to the first mechanical shaft 51 and the second mechanical shaft 52.

The first mechanical shaft 51 and the second mechanical shaft 52 are in this example in the form of two independent drive shafts extending along the width of the airplane 100 and configured to allow transmission of a rotational motion. Also, the energy recovered by the turbine 23 allows, via the first mechanical shaft 51 and the second mechanical shaft 52, the respective rotation of the first rotating propulsive member 11 and the second rotating propulsive member 12. Alternatively, the two mechanical shafts are integral with each other and form a single mechanical shaft 5 connected to both the first rotating propulsive member 11 and the second rotating propulsive member 12. With reference to FIG. 3, the third mechanical shaft 53 extends along the length of the airplane 100.

The transmission box 3 comprises, in this example, a plurality of gears, configured to transform the rotational motion of the third mechanical shaft 53 extending along the length of the airplane 100 into rotational motion of the first mechanical shaft 51 and the second mechanical shaft 52, extending transversely through the airplane 100. The transmission box 3 further enables the gear ratios to be adjusted. The transmission box 3 is preferably configured to rotatably drive the rotating propulsive members 1 at the same speed in order to provide symmetrical thrusts.

As illustrated in FIG. 3, the first mechanical shaft 51 and the second mechanical shaft 52 are respectively connected to the rotating propulsive members 1 through transfer boxes 7. Such transfer boxes 7 allow an optimal drive of the rotating propulsive members 1 along axes parallel to the longitudinal axis X.

The dissociation of the rotating propulsive members 1 and of the gas generator 2 allows the placement of a single gas generator 2 that can be placed in a different position and away from the rotating propulsive members 1 on the main body 101 of the airplane 100. Also, in order to reduce its aerodynamic impact, the gas generator 2 may have larger dimensions and therefore greater power. The dissociation of the gas generator 2 advantageously allows its placement on aircraft with small dimensions.

The auxiliary turbomachine 4, in this example in the form of an APU defining an auxiliary power unit, generally placed on an aircraft and allowing the operation, for example, of the lighting and air conditioning when the aircraft is parked and the turbine engines are cut off.

Preferably, the auxiliary turbomachine 4 is positioned in the tail unit of the aircraft. Even more preferably, the auxiliary turbomachine 4 is configured to produce electric energy on board the aircraft to power various on-board systems of said aircraft on the ground.

According to the invention, the auxiliary turbomachine 4 is configured to supplement the gas generator 2 in case of malfunction or when the airplane 100 requires a higher thrust P. For this, the auxiliary turbomachine 4 is configured to provide a thrust P accounting for between 5 and 20% of the thrust capacity generated by the rotating propulsive members 1, which is between 2*1000 Ibf (2*4448N) and 2*7000 Ibf (2*31136N). Such a power allows the airplane 100 in case of malfunction of the gas generator 2 to be able to fly, for example, to an airport, to ensure a safe landing.

Preferably, the auxiliary turbomachine 4 is configured to provide thrust to participate in the propulsion of the aircraft (thrust available). According to a first exemplary embodiment of the invention, with reference to FIG. 3, the auxiliary turbomachine 4 is configured to be mechanically connected to the transmission box 3, for example, by means of a clutch module 6. Such a clutch module 6 advantageously allows the auxiliary turbomachine 4 to be connected to and/or disconnected from the transmission box 3 as required.

In this embodiment, the transmission box 3 is thus configured to allow the auxiliary turbomachine 4 to drive the rotating propulsive members 1 via the transmission box 3. Indeed, the clutch module 6 is configured to allow switching between the gas generator 2 and the auxiliary turbomachine 4 as required, for example depending on whether one or the other is in operation. In other words, the clutch module 6 allows the transmission box 3 to be controlled by either the gas generator 2, the auxiliary turbomachine 4, or the combination of the gas generator 2 and the auxiliary turbomachine 4, in such a way as to allow the rotation of the rotating propulsive members 1 under any circumstances. According to one exemplary embodiment, such a clutch module 6 is controlled by the pilot of the airplane 100 via a switch-type control button, for example integrated into the cockpit of the airplane 100.

Preferably, the clutch module 6 is of the differential type or is in the form of a clutch system, for example of the freewheel type, so as, advantageously, to avoid mutual drive of the gas generator 2 and the auxiliary turbomachine 4 which are thereby connected.

According to a second embodiment of the invention, represented in FIGS. 5 to 7, the auxiliary turbomachine 4 provides a drive torque in an indirect manner. For this purpose, the propulsion system 10 comprises an electric generator 8 configured to power one or more electric motors 9 for rotatably driving the rotating propulsive members 1. The electric generator 8 is driven directly by the auxiliary turbomachine 4 and the electric generator 8 is electrically connected to one or more electric motors 9. The use of electric motors 9 advantageously allows to limit energy dissipation in the different mechanical modules. For this, the powered electric motor(s) 9 can be mounted according to different configurations.

According to a first configuration represented in FIG. 5, a single electric motor 9 is mounted on the transmission box 3, preferably via a clutch module 6, to provide an input torque. Such a configuration advantageously allows the auxiliary turbomachine 4 to be offset for overall size reasons or if the latter has a limited capacity.

According to a second configuration represented in FIG. 6, the propulsion system 10 comprises a single mechanical shaft 5 extending between the first rotating propulsive member 11 and the second rotating propulsive member 12. In other words, the first mechanical shaft 51 and the second mechanical shaft 52 are integral with each other. A single electric motor 9 is mounted on the single mechanical shaft 5 to drive it. Thus, the transmission box 3 does not receive any input torque from the electric motor 9, which simplifies the structure of the transmission box 3. The single electric motor 9 is mounted between the transmission box 3 and one of the transfer boxes 7 described above. Such a positioning of the electric motor 9 advantageously makes it possible to reduce power losses while allowing both the first rotating propulsive member 11 and the second rotating propulsive member 12 to be driven by a single electric motor 9.

According to a third configuration represented in FIG. 7, the first mechanical shaft 51 and the second mechanical shaft 52 are independent of each other. An electric motor is mounted on each mechanical shaft to drive it independently. In other words, a first electric motor 91 is mounted on the first mechanical shaft 51 between the transfer box 7 of the first rotating propulsive member 11 and the transmission box 3, and a second electric motor 92 is mounted on the second mechanical shaft 52 between the transfer box 7 of the second rotating propulsive member 12 and the transmission box 3. Such a mounting advantageously allows to limit power losses due to the passage in the transmission box 3 when the propulsion system 10 comprises a first mechanical shaft 51 and a second mechanical shaft 52. Furthermore, this allows the use of electric motors 91, 92 having lower power.

According to a third embodiment of the invention represented in FIG. 8, two electric motors 91, 92 are directly connected to each of the two rotating propulsive members 1, each electric motor 91, 92 being configured to directly drive the rotating propulsive member 11, 12 with which it is directly engaged. Such a configuration advantageously makes it possible to further limit transmission energy losses between an electric motor 9 and a rotating propulsive member 1.

Optionally, the electric generator 8 is electrically connected to one or more electric motors 9 via an electric storage battery. Thus, an electric motor 9 can be operated without the auxiliary turbomachine 4 or the gas generator 2 being in operation, for example during taxiing operations, thereby reducing pollutant emissions.

Advantageously, the auxiliary turbomachine 4 is configured to be activated when the gas generator 2 is simply turned off, that is not only in case of malfunction. Indeed, the auxiliary turbomachine 4 also has the advantage of being configured to be used alone, for example, when the airplane 100 is moving on the ground, a phase during which the airplane 100 does not require significant thrust. Such a use advantageously makes it possible to limit fuel consumption while limiting pollutant emissions. The use of electric motors 9 further reduces noise pollution.

Also, in the propulsion system 10 according to the invention, the gas generator 2 and the auxiliary turbomachine 4 can be used together or independently of each other, as required. Indeed, the latter have the advantage of being completely separate. Such a propulsion system 10 has the further advantage of being able to be placed on airplanes with small dimensions, while ensuring a thrust P large enough to allow the airplane 100 to displace under optimal conditions.

A method for operating the propulsion system 10, with reference to FIG. 9, according to a preferred mode of implementation of the invention will now be described.

The example described herein sets forth the operation of a propulsion system 10 according to the first embodiment of the invention, represented in FIG. 3 and in which the auxiliary turbomachine 4 is connected directly to the transmission box 3 via a clutch module 6.

The method first comprises a step of activating E1 the single gas generator 2, for example via a control element activated by the pilot of the airplane 100. The energy generated by the gas generator 2 allows the third mechanical shaft 53 to be rotated, which then rotatably drives, in a step E2, the first mechanical shaft 51 and the second mechanical shaft 52 via the transmission box 3.

The method comprises a step E3 of rotatably driving the first rotating propulsive member 11 via the first mechanical shaft 51 and the second rotating propulsive member 12 via the second mechanical shaft 52.

According to a first implementation mode, when the power generated by the gas generator 2 is less than a predetermined power, the method comprises a step of activating E4 the auxiliary turbomachine 4 in order to provide an additional drive torque. With reference to FIG. 3, the auxiliary turbomachine 4 is connected to the transmission box 3 by a direct mechanical connection. This advantageously provides additional output torque to the mechanical shafts 51, 52 to rotatably drive the first rotating propulsive member 11 and the second rotating propulsive member 12, respectively.

In other alternative embodiments illustrated in FIGS. 5-8, the auxiliary turbomachine 4 drives the electric generator 8 which electrically powers one or more electric motors 9. With reference to FIG. 5, the electric motor 9 provides additional drive torque to the transmission box 3 by direct mechanical connection (FIG. 5). Advantageously, this provides additional output torque to the mechanical shafts 51, 52 to rotatably drive the first rotating propulsive member 11 and the second rotating propulsive member 12, respectively.

With reference to FIGS. 6 and 7, the electric motor(s) 9 provide additional drive torque downstream of the transmission box 3, in particular, on the integral (FIG. 6) or independent (FIG. 7) mechanical shafts 51, 52.

With reference to FIG. 8, the electric motor(s) 9 provide additional drive torque downstream of the transfer boxes 7 and are connected to the first rotating propulsive member 11 and the second rotating propulsive member 12, respectively, in direct engagement.

The method of operation of the propulsion system 10 advantageously allows the auxiliary turbomachine 4 to be used as a replacement for or in addition to a gas generator 2, for example, if the latter has a malfunction, reduced capacities, or if the airplane 100 requires a greater thrust P. Moreover, the use of electric motors and an electric battery makes it possible to rotatably drive the rotating propulsive members without the auxiliary turbomachine or the gas generator being in operation, for example during taxiing operations. Such a method further allows to limit the pollutant emissions as well as the noise pollution.

The invention claimed is:

1. A propulsion system for mounting on an aircraft comprising a main body, said propulsion system comprising:
    a first rotating propulsive member and a second rotating propulsive member, the first and second rotating propulsive members adopted for mounting on either side of said main body;
    a transmission box connected to the first rotating propulsive member via a first mechanical shaft and to the second rotating propulsive member via a second mechanical shaft;
    a single gas generator comprising a compressor, a combustion chamber, and a turbine, the single gas generator is configured to produce a thrust of X-Newtons (N) and operatively connect to said transmission box to rotatably drive the first rotating propulsive member and the second rotating propulsive member;
    a single auxiliary turbomachine connected to the transmission box via a clutch;
    wherein the single auxiliary turbomachine has two operating modes during flight to rotate the first and second rotating propulsive members, including a first operating mode in which the single gas generator is running and a second operating mode in which the single gas generator is cut off; and wherein the single auxiliary turbomachine, when operating, is sized to generate thrust that is less than the thrust of the X-N generated by the single gas generator, wherein the X-N is a numerical value, and the single auxiliary turbomachine is sized to generate thrust of between about 5%-20% of the X-N.

2. The propulsion system according to claim 1, wherein the single auxiliary turbomachine is an auxiliary power unit (APU) that is arranged to power light and air condition when the aircraft is on a ground and the single gas generator is cut off.

3. A propulsion system for mounting on an aircraft comprising a main body, said propulsion system comprising:
    a first rotating propulsive member and a second rotating propulsive member, the first and second rotating propulsive members adopted for mounting on either side of said main body;
    a transmission box connected to the first rotating propulsive member via a first mechanical shaft and to the second rotating propulsive member via a second mechanical shaft;
    a single gas generator comprising a compressor, a combustion chamber, and a turbine, the single gas generator is configured to produce a thrust of X-Newtons (N) and operatively connect to said transmission box to rotatably drive the first rotating propulsive member and the second rotating propulsive member;
    a single auxiliary turbomachine connected to an electric generator that powers a motor and the motor is operatively connected to at least one of the first rotating propulsive member and the second rotating propulsive member;
    wherein the single auxiliary turbomachine has two operating modes during flight to rotate the first and second rotating propulsive members, including a first operating mode in which the single auxiliary turbomachine is operating and the single gas generator is running and a second operating mode in which the single auxiliary turbomachine is operating and the single gas generator is cut off;
    wherein the single auxiliary turbomachine, when operating, is sized to generate thrust that is less than the thrust of the X-N generated by the single gas generator, and wherein the X-N is a numerical value; and
    wherein the motor is directly connected to the transmission box to directly drive the transmission box and the single auxiliary turbomachine is sized to generate thrust of between about 5%-20% of the X-N.

4. The propulsion system according to claim 3, wherein the single auxiliary turbomachine is an auxiliary power unit (APU) that is arranged to power light and air condition when the aircraft is on a ground and the single gas generator is cut off.

5. The propulsion system according to claim 3, wherein the single auxiliary turbomachine is connected to the electric generator and the motor is connected to a clutch, which is connected to the transmission box.

6. The propulsion system according to claim 3, wherein the single auxiliary turbomachine is connected to the electric generator and the motor directly drives the first mechanical shaft that powers the first rotating propulsive member, the second mechanical shaft that powers the second rotating propulsive member or a mechanical shaft that powers both the first and second rotating propulsive members.

* * * * *